US010221757B2

(12) United States Patent
Onishi et al.

(10) Patent No.: US 10,221,757 B2
(45) Date of Patent: Mar. 5, 2019

(54) INTAKE JOINT STRUCTURE FOR TURBOCHARGER

(71) Applicants: HINO MOTORS, LTD., Hino-shi (JP); EXCELL CORPORATION, Matsudo-shi (JP)

(72) Inventors: Takahiro Onishi, Tokyo (JP); Takashi Tamura, Tokyo (JP)

(73) Assignees: HINO MOTORS, LTD., Hino-shi (JP); EXCELL CORPORATION, Matsudo-shi (JP)

( * ) Notice: Subject to any disclaimer, the term of this patent is extended or adjusted under 35 U.S.C. 154(b) by 127 days.

(21) Appl. No.: 15/519,863

(22) PCT Filed: Dec. 3, 2015

(86) PCT No.: PCT/JP2015/083985
§ 371 (c)(1),
(2) Date: Apr. 18, 2017

(87) PCT Pub. No.: WO2016/093143
PCT Pub. Date: Jun. 16, 2016

(65) Prior Publication Data
US 2017/0362994 A1   Dec. 21, 2017

(30) Foreign Application Priority Data

Dec. 9, 2014   (JP) ................. 2014-248582

(51) Int. Cl.
| F02B 39/14 | (2006.01) |
| F02M 35/10 | (2006.01) |
| F02B 37/00 | (2006.01) |
| F02B 39/00 | (2006.01) |

(Continued)

(52) U.S. Cl.
CPC .............. *F02B 39/14* (2013.01); *F01D 25/14* (2013.01); *F01D 25/24* (2013.01); *F02B 29/04* (2013.01);

(Continued)

(58) Field of Classification Search
CPC .......... F02B 29/04; F02B 37/00; F02B 39/00; F02B 39/16; F02B 39/14; F01D 25/14;
(Continued)

(56) References Cited

U.S. PATENT DOCUMENTS 6,216,656 B1 *   4/2001   Hada ................ F02M 35/10039
                                                          123/184.34
2004/0144374 A1   7/2004   Knollmayr

FOREIGN PATENT DOCUMENTS

| DE | 102 52 474 A1 | 6/2004 |
| EP | 2 713 025 A1 | 4/2014 |

(Continued)

OTHER PUBLICATIONS

International Search Report dated Feb. 16, 2016 in PCT/JP2015/083985 filed Dec. 3, 2015.
(Continued)

*Primary Examiner* — Mahmoud Gimie
(74) *Attorney, Agent, or Firm* — Oblon, McClelland, Maier & Neustadt, L.L.P.

(57) ABSTRACT

Disclosed is an intake joint structure capable of blocking backflow of lubricating oil 18 at a connection position between an air inlet 12 of a turbocharger and a suction pipe 24. A backflow-preventive plate 25 is integrally molded to have a cylindrical portion 25a fitted over the air inlet 12 and a tapered portion 25b curved inward from an upstream end of the cylindrical portion 25a and converged downstream to provide an open end. A downstream end 24a of a suction pipe 24 is molded by soft material over a predetermined range using exchange blow molding. The cylindrical portion 25a of the backflow-preventive plate 25 is fitted over the air inlet 12 through a grommet 26 (first soft layer) and the downstream end 24a of the suction pipe 24 is fitted over the cylindrical portion 25a and is banded by a hose band 27.

18 Claims, 5 Drawing Sheets

(51) Int. Cl.
*F16L 3/12* (2006.01)
*F16L 5/02* (2006.01)
*F01D 25/14* (2006.01)
*F01D 25/24* (2006.01)
*F02B 29/04* (2006.01)
*F02C 6/12* (2006.01)
*F02B 39/16* (2006.01)

(52) U.S. Cl.
CPC .............. *F02B 37/00* (2013.01); *F02B 39/00* (2013.01); *F02B 39/16* (2013.01); *F02C 6/12* (2013.01); *F02M 35/10* (2013.01); *F02M 35/10118* (2013.01); *F02M 35/10124* (2013.01); *F02M 35/10144* (2013.01); *F02M 35/10157* (2013.01); *F16L 3/12* (2013.01); *F16L 5/02* (2013.01); *F05D 2220/40* (2013.01); *Y02T 10/146* (2013.01)

(58) Field of Classification Search
CPC ........... F01D 25/24; F02C 6/12; F02M 35/10; F02M 35/10124; F02M 35/10144; F02M 35/10118; F02M 35/10157; F16L 3/12; F16L 5/02

USPC ..................................................... 123/559.1
See application file for complete search history.

(56) References Cited

FOREIGN PATENT DOCUMENTS

| | | |
|---|---|---|
| JP | 64-56524 A | 3/1989 |
| JP | 2-13141 U | 1/1990 |
| JP | 3-55791 Y2 | 12/1991 |
| JP | 7-259529 A | 10/1995 |
| JP | 2007-71179 A | 3/2007 |
| JP | 5626463 B2 | 11/2014 |

OTHER PUBLICATIONS

Extended European Search Report dated Apr. 4, 2018 in Patent Application No. 15867818.5.

* cited by examiner

INTAKE JOINT STRUCTURE FOR TURBOCHARGER

TECHNICAL FIELD

The present invention relates to an intake joint structure for a turbocharger.

BACKGROUND ART

FIG. 1 is an example of a typical turbocharger. In the turbocharger 1 illustrated, a turbine wheel 2 is connected with a compressor impeller 3 through a shaft 4 which in turn is rotatably supported by a center housing 5. The turbine wheel 2 is received in a turbine housing 6 mounted on the center housing 5 while the compressor impeller 3 is received in a compressor housing 7 mounted on the center housing 5.

Formed in the turbine housing 6 is a turbine scroll 8 so as to surround an outer periphery of the turbine wheel 2. Tangentially introduced into the turbine scroll 8 through an exhaust gas inlet (not shown) is exhaust gas 9 by which the turbine wheel 2 is rotatively driven. The exhaust gas 9 having driven the turbine wheel 2 is axially extracted to an exhaust gas outlet 10.

Formed in the compressor housing 7 is a compressor scroll 11 so as to surround an outer periphery of the compressor impeller 3. By the compressor impeller 3 rotated in accordance with rotation of the turbine wheel 2, sucked air 13 axially taken through an air inlet 12 is compressed and expelled to the compressor scroll 11 and is discharged through the compressor scroll 11 to a compressed air outlet (not shown).

In such turbocharger 1, the shaft 4 for connection of the turbine wheel 2 with the compressor impeller 3 is supported by a floating metal 14 (a bearing portion). Lubricating oil 18 pumped from an oil pan 15 by an oil pump 16 and cooled by an oil cooler 17 is supplied to the floating metal 14 through an oil pathway 19.

The oil pathway 19 comprises an oil supply passage 20 drilled in the center housing 5 and an oil supply pipe 21 routed outside of the center housing 5. The oil supply pipe 21 is connected with the oil supply passage 20 through a joint bolt 22.

The floating metal 14 has an oil throwing mechanism such that the lubricating oil 18 from a gap between the bearing portion and the shaft 4 is flicked out by a centrifugal force of the shaft 4 to an oil discharge port 23 so as to return the oil to the oil pan 15 before leaking of the oil toward the turbine wheel 2 and compressor impeller 3.

In such turbocharger 1, a range of supplied oil amount to the bearing portion on the shaft 4 for connection of the turbine wheel 2 with the compressor impeller 3, which is usable with no fear of oil leakage and seizing, is defined and specified as standard by manufacturers. Since seizing of the bearing portion is to be especially and absolutely prevented, oil supply characteristic is properly set such that the supplied oil amount is reliably within the above-mentioned safely usable range even in a case of a full load where speed-up is attained with an accelerator being fully opened.

There exists, for example, below-mentioned Patent Literature 1 showing general state of the art pertinent to a turbocharger.

CITATION LIST

Patent Literature

Patent Literature 1: JP 2007-71179A

SUMMARY OF INVENTION

Technical Problems

However, a relationship between engine and turbo rotational frequencies is such that, in a case of the full load, the turbocharger 1 is rotated more effectively as the engine rotational frequency is increased whereas, in a case of no load in, e.g., downhilling with an engine brake on and with an accelerator off, the turbocharger 1 is not rotated much even if the engine rotational frequency is increased (the condition where the turbine wheel 2 is merely supplied with compressed air and is not effectively driven). Thus, there may be a fear in the case of no load that the engine rotational frequency is substantially increased irrespective of the low turbo rotational frequency to drastically increase the supplied oil amount beyond the above-mentioned safely usable range in the turbo rotational frequency, leading to leakage and backflow of the lubricating oil 18 to the suction side and resultant contamination of components in the air cleaner.

Especially, in a truck or other transporter vehicle with the air cleaner mounted on a chassis and thus liable to be laid out in a lower position, a vehicle portion from the air inlet 12 in the turbocharger 1 to the air cleaner tends to have a downward gradient; thus, there is a fear that the lubricating oil 18 may flow down to the air cleaner while the vehicle is stopped.

The invention was made in view of the above and has its object to provide an intake joint structure capable of preventing oil leakage from a turbocharger to an intake side.

Solution to Problems

The invention is directed to an intake joint structure for a turbocharger capable of blocking backflow of lubricating oil at a connection position between an air inlet of the turbocharger and a suction pipe, characterized in that it comprises an integrally molded backflow-preventive plate having a cylindrical portion fitted over said air inlet and a tapered portion curved inward from an upstream end of said cylindrical portion and converged downstream to provide an open end, a downstream end of said suction pipe being integrally molded from soft material over a predetermined range using exchange blow molding, the cylindrical portion of said backflow-preventive plate being fitted over said air inlet via a first soft layer, the downstream end of said suction pipe being fitted over said cylindrical portion and being banded by a hose band.

With such construction, in an operational condition in, e.g., downhilling with an engine brake on and with an accelerator off where an engine rotational frequency is substantially increased irrespective of a low turbo rotational frequency to drastically increase a supplied oil amount, excessive lubricating oil may leak to the air inlet of the turbocharger, but backflow of the lubricating oil along an inner wall of the air inlet is blocked by the tapered portion of the backflow-preventive plate to block inflow of the oil into the suction pipe, thereby reliably preventing oil leakage from the turbocharger to the suction side.

In this connection, the backflow-preventive plate requires to be molded from highly durable hard material so as to reliably prevent a trouble that aged deterioration may cause the plate to be partly fractured into pieces and sucked into the turbocharger. However, mere interposition of the backflow-preventive plate at the connection position between the air inlet of the turbocharger and the suction pipe may result in fitting-together of hard materials since the suction pipe is generally blow-molded from polypropylene resin, leading to difficulty in ensuring the sealability.

However, in the invention, the downstream end of the suction pipe is molded from soft material over the predetermined range using exchange blow molding, and the cylindrical portion of the backflow-preventive plate is fitted over the air inlet via the first soft layer, so that flexible transformation of the downstream end of the suction pipe and of the first soft layer eliminates any gap between the parts to be fitted together to thereby ensure satisfactory sealability.

Further, it is preferable in an aspect of the invention that the cylindrical portion of the backflow-preventive plate has a downstream end turned over outward as a turnover portion to provide a first annular groove opened upstream on which the downstream end of the suction pipe may abut for positioning.

With this construction, when the downstream end of the suction pipe is to be fitted over the cylindrical portion of the backflow-preventive plate, the downstream end of the suction pipe can abut for positioning on the first annular groove, which eliminates a fear that the cylindrical portion in the backflow-preventive plate may be shifted inward of the downstream end of the suction pipe, thereby substantially enhancing workability upon mounting of the backflow-preventive plate.

Without such positioning structure, the cylindrical portion of the backflow-preventive plate might be shifted without being recognized due to the overlaying downstream end of the suction pipe which hides the cylindrical portion and would be left unattended, possibly resulting in deteriorated sealability due to resultant ineffective banding by the hose band or/and resultant easy drop of the backflow-preventive plate due to insufficient clamp of the cylindrical portion at the position between the air inlet and the downstream end of the suction pipe.

Further, in an aspect of the invention, a separate grommet made from soft material may be interposed as first soft layer between the cylindrical portion of the backflow-preventive plate and the air inlet. Then, mere interposition of the grommet can enhance the sealability between the cylindrical portion of the backflow-preventive plate and the air inlet.

It is preferable in use of such grommet that the grommet has a downstream end turned over outside as a turnover portion to provide a second annular groove opened upstream on which the turnover portion of the backflow-preventive plate may abut for positioning.

This enables abutment, for positioning, of the turnover portion of the backflow-preventive plate on the second annular groove so that the fear of the grommet being shifted inward of the cylindrical portion of the backflow-preventive plate is eliminated to substantially enhance the workability upon mounting of the grommet.

Further, in an aspect of the invention, the cylindrical portion of the backflow-preventive plate may have an outer periphery integrally molded with a second soft layer using two-color molding, which can bring about fitting-together of the soft materials between the downstream end of the suction pipe and the cylindrical portion of the backflow-preventive plate to thereby further enhance the sealability.

Alternatively, the cylindrical portion of the backflow-preventive plate may be integrally molded as second soft layer using two-color molding and an interlocking structure may be provided between an upstream end of the cylindrical portion and an outer periphery of the tapered portion, which makes it possible to reliably interconnect the cylindrical and tapered portions through the interlocking structure and utilize the whole of the cylindrical portion as second soft layer to thereby further enhance the clamping capacity.

Advantageous Effects of Invention

The intake joint structure for the turbocharger as mentioned in the above according to the invention can attain various excellent effects as mentioned below.

(I) oil leakage from the turbocharger to the suction side can be reliably prevented to preliminarily prevent components of the air cleaner from being contaminated by leaking lubricating oil. Moreover, interposition of the backflow-preventive plate at the connection position between the air inlet of the turbocharger and the suction pipe can ensure satisfactory sealability to reliably prevent leakage of the sucked air.

(II) If the cylindrical portion of the backflow-preventive plate has the downstream end turned over outside as turnover portion to provide the first annular groove opened upstream on which the downstream end of the suction pipe may abut for positioning, the cylindrical portion of the backflow-preventive plate can be prevented from being shifted inward of the downstream end of the suction pipe, thereby substantially enhancing the workability upon mounting of the backflow-preventive plate.

(III) If the separate grommet made from soft material is interposed as first soft layer between the cylindrical portion of the backflow-preventive plate and the air inlet, the mere interposition of the grommet can easily enhance the sealability between the cylindrical portion of the backflow-preventive plate and the air inlet, thereby suppressing a cost necessary for enhanced sealability at the position.

(IV) If the grommet has the downstream end turned over outside as turnover portion to provide the second annular groove opened upstream on which the turnover portion of the backflow-preventive plate may abut for positioning, the turnover portion of the backflow-preventive plate can abut for positioning on the second annular groove, which can eliminate the fear of the grommet being shifted inward of the cylindrical portion of the backflow-preventive plate, thereby substantially enhancing workability upon mounting of the grommet.

(V) If the cylindrical portion of the backflow prevent plate has the outer periphery integrally molded with the second soft layer using two-color molding, fitting-together of the soft materials between the downstream end of the suction pipe and the cylindrical portion of the backflow-preventive plate can further enhance the sealability and further reliably prevent leakage of the sucked air.

(VI) If the cylindrical portion of the backflow-preventive plate is integrally molded as second soft layer using two-color molding and the interlocking structure is provided between the upstream end of the cylindrical portion and the outer periphery of the tapered portion, the cylindrical and tapered portions can be reliably interlocked through the interlocking structure and the whole of the cylindrical portion can be utilized as second soft layer to further enhance the clamping force.

DESCRIPTION OF EMBODIMENTS

Next, embodiments of the invention will be described in conjunction with the drawings.

Figure 1:
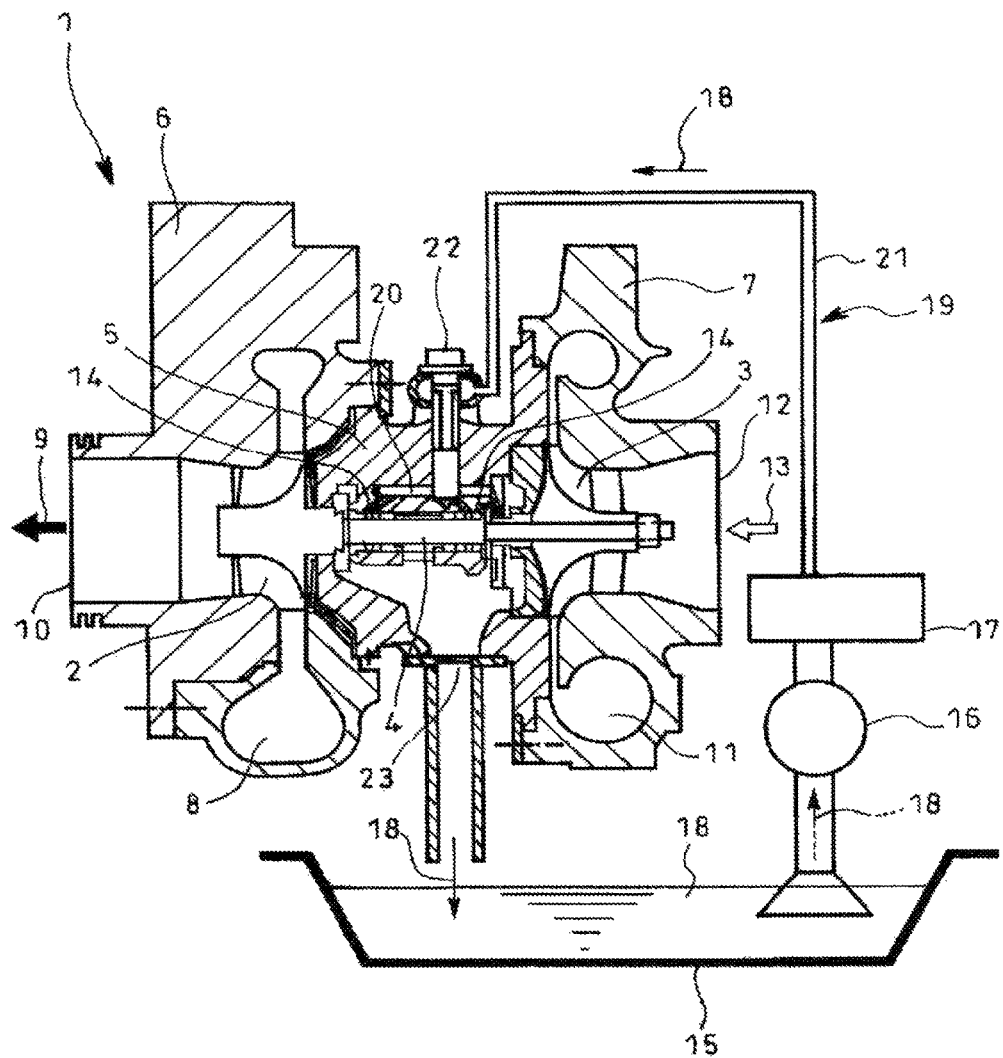
FIG. 1 is a sectional view showing an example of a typical turbocharger.
Figure 2:
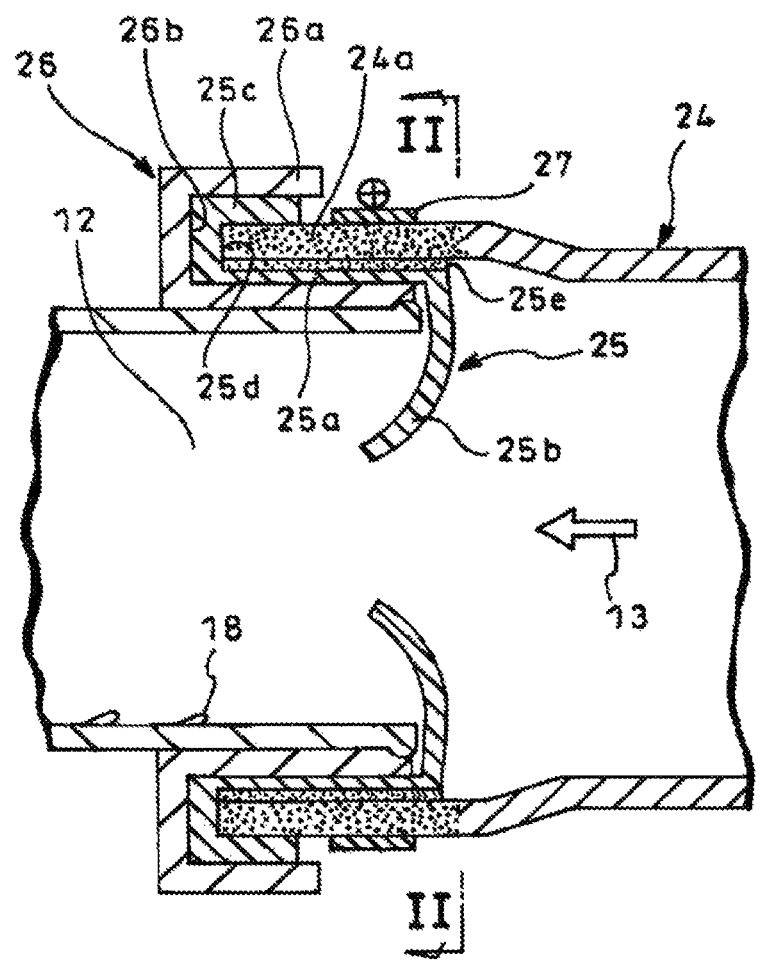
FIG. 2 is a sectional view showing an embodiment of the invention.
Figure 3:
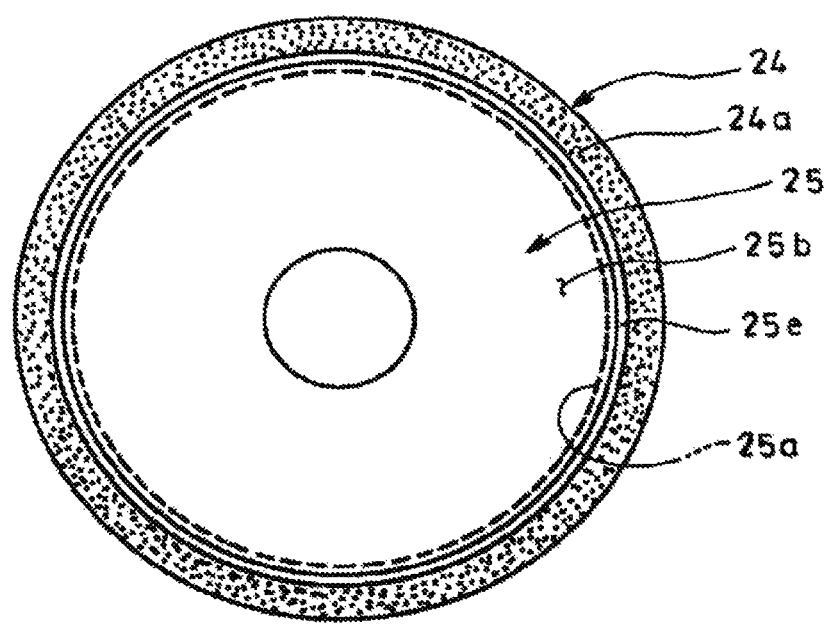
FIG. 3 is a sectional view in a direction of arrows III in FIG. 2.

FIGS. 2 and 3 show an embodiment of an intake joint structure according to the invention characterized in that a backflow-preventive plate 25 is interposed at a connection position between an air inlet 12 of the turbocharger 1 mentioned above (see FIG. 1) and a suction pipe 24 so as to make it possible to block backflow of lubricating oil 18.

The backflow-preventive plate 25 is integrally molded to have a cylindrical portion 25a fitted over the air inlet 12 and a tapered portion 25b curved inward from an upstream end (right-sided end in FIG. 2) of the cylindrical portion 25a and converged downstream (left in FIG. 2) to provide an open end. The cylindrical portion 25a has a downstream end turned over outward as turnover portion 25c to provide a first annular groove 25d opened upstream on which a downstream end of the suction pipe 24 may abut for positioning.

This kind of backflow-preventive plate 25 requires to be molded with highly durable hard material so as to reliably prevent a trouble that aged deterioration causes the plate to be partly fractured into pieces and sucked into the turbocharger 1. However, mere interposition of the backflow-preventive plate 25 at a connection position between the air inlet 12 of the turbocharger 1 and the suction pipe 24 might result in fitting-together of hard materials since the suction pipe 24 is generally blow-molded from polypropylene resin, leading to difficulty in ensuring sealability.

Thus, in the embodiment, the downstream end 24a of the suction pipe 24 is molded from soft material over a predetermined range using exchange blow molding (blow molding of a type integrating different materials together in a single process). The cylindrical portion 25a of the backflow-preventive plate 25 is fitted over the air inlet 12 via a grommet 26 (first soft layer) made from rubber or other soft material, and the downstream end 24a of the suction pipe 24 is fitted over the cylindrical portion 25a and is banded by a hose band 27, so that flexible transformation of the grommet 26 and the downstream end 24a of the suction pipe 24 eliminates any gap between the parts to thereby ensure satisfactory sealability.

Especially in the embodiment illustrated, the cylindrical portion 25a of the backflow-preventive plate 25 has an outer periphery integrally molded with a soft layer 25e (second soft layer) using two-color molding (injection molding of a type where a primary side of different materials is molded and a secondary side is thermally fused on and integrated with the primary side in one and the same mold), which can provide fitting-together of soft materials between the downstream end 24a of the suction pipe 24 and the cylindrical portion 25a of the backflow-preventive plate 25, thereby further enhancing the sealability.

In use of the grommet 26 as mentioned in the above, it is further preferable that the grommet 26 has a downstream end turned over outward as turnover portion 26a to provide a second annular groove 26b opened upstream on which the turnover portion 25c of the backflow-preventive plate 25 may abut for positioning.

With such construction, in an operational condition in, e.g., downhilling with an engine brake on and with an accelerator off where an engine rotational frequency is substantially increased irrespective of a low turbo rotational frequency to drastically increase a supplied oil amount, excessive lubricating oil 18 may leak to the air inlet 12 of the turbocharger 18, but backflow of the lubricating oil 18 along an inner wall of the air inlet 12 is blocked by the tapered portion 25b of the backflow-preventive plate 25 to prevent inflow of the oil into the suction pipe 24, thereby reliably preventing oil leakage from the turbocharger 1 to the suction side.

Moreover, the suction pipe 24 has the downstream end 24a molded from soft material over a predetermined range using exchange blow molding and the cylindrical portion 25a of the backflow-preventive plate 25 is fitted over the air inlet 12 via the grommet 26 made of soft material, so that flexible transformation of the downstream end 24a of the suction pipe 24 and of the soft layer 25e eliminates any gap between the parts to thereby ensure satisfactory sealability. Especially, according to the embodiment, when the cylindrical portion 25a of the backflow-preventive plate 25 has the outer periphery integrally molded with the soft layer 25e using two-color molding, the downstream end 24a of the suction pipe 24 and the cylindrical portion 25a of the backflow-preventive plate 25 provide fitting-together of the soft materials, thereby further enhancing the sealability.

Since the downstream end of the suction pipe 24 can abut for positioning on the first annular groove 25d upon fitting the downstream end of the suction pipe 24 over the cylindrical portion 25a of the backflow-preventive plate 25, any shifting of the cylindrical portion 25a of the backflow-preventive plate 25 inward of the downstream end 24a of the suction pipe 24 is prevented to substantially enhance the workability upon mounting of the backflow-preventive plate 25.

Specifically, without such positioning structure, the cylindrical portion 25a of the backflow-preventive plate 25 might be shifted without being recognized due to the overlaying downstream end 24a of the suction pipe 24 which hides the cylindrical portion 25a and would be left unattended, possibly resulting in deteriorated sealability due to resultant ineffective banding by the hose band 27 or/and resultant easy drop of the backflow-preventive plate 25 due to insufficient clamp of the cylindrical portion 25a at the position between the air inlet 12 and the downstream end 24a of the suction pipe 24.

Thus, according to the above-mentioned embodiment, oil leakage from the turbocharger 1 to the suction side can be reliably prevented to preliminarily prevent components of the air cleaner from being contaminated by leaking lubricating oil 18. Moreover, even the backflow-preventive plate 25 is interposed at the connection position between the air inlet 12 of the turbocharger 1 and the suction pipe 24, satisfactory sealability can be ensured. Furthermore, any fear of the cylindrical portion 25a of the backflow-preventive plate 25 being shifted inward of the downstream end 24a in the suction pipe 24 can be eliminated to thereby substantially enhance the workability upon mounting of the backflow-preventive plate 25.

Moreover, mere interposition of the grommet 26 can readily enhance the sealability between the cylindrical portion 25a in the backflow-preventive plate 25 and the air inlet 12, so that a cost necessary for enhancement of the sealability at this position can be suppressed. Moreover, since the turnover portion 25c of the backflow-preventive plate 25 can abut for positioning on the second annular groove 26b of the grommet 26, any fear of the grommet 26 being shifted inside of the cylindrical portion 25a of the backflow-preventive plate 25 can be eliminated to thereby substantially enhance the workability upon mounting of the grommet 26.

Figure 4:
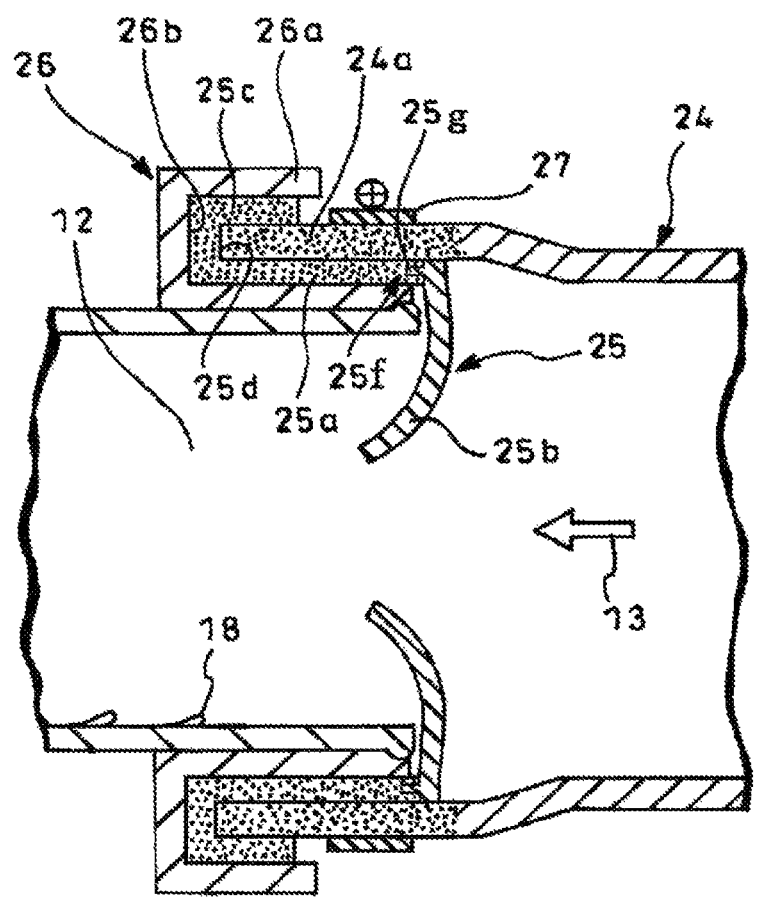
FIG. 4 is a sectional view showing a further embodiment of the invention.

FIG. 4 is a sectional view showing a further embodiment of the invention where a cylindrical portion 25a of a backflow-preventive plate 25 is integrally molded as soft layer (second soft layer) using two-color molding and an interlock structure 25f is provided between an upstream end of the cylindrical portion 25a and an outer periphery of the tapered portion 25b. More specifically, a projection 25g which projects downstream is circumferentially formed over the outer periphery of the tapered portion 25b and the cylindrical portion 25a is thermally fused onto the projection 25g in a sandwich manner in the molding into an interlock structure 25f. With such construction, the cylindrical portion 25a is reliably interlocked with the tapered portion 25b through the interlock structure 25f to utilize the whole of the cylindrical portion 25a as second soft layer to thereby further enhance the clamping force.

Figure 5:
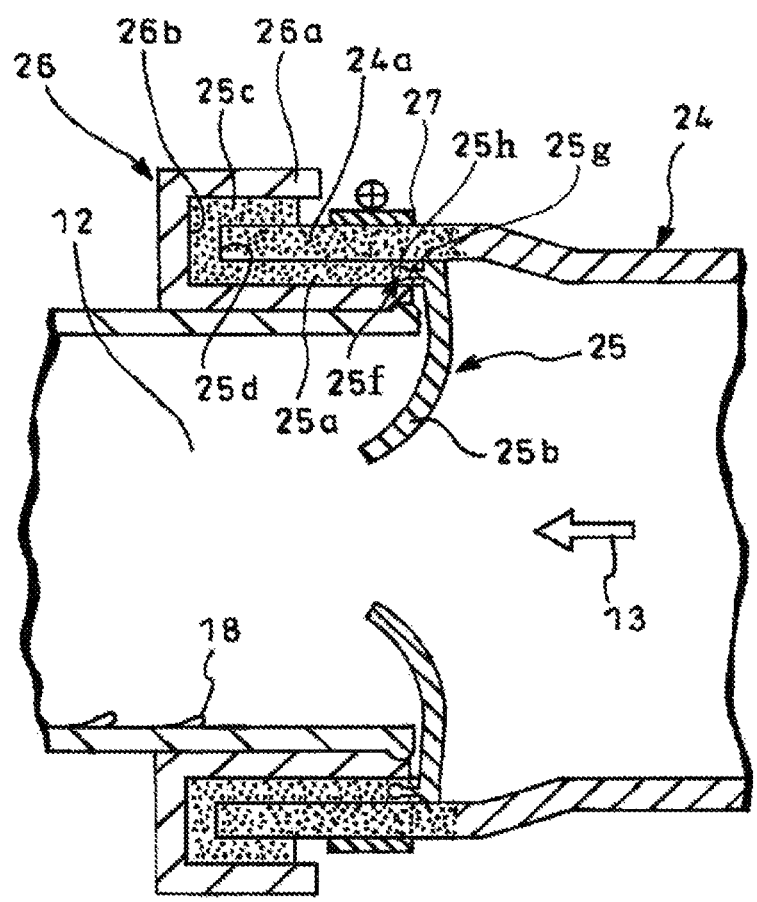
FIG. 5 is a sectional view showing a still further embodiment of the invention.

FIG. 5 is a sectional view showing a still further embodiment of the invention. As illustrated, a stronger connection may be attained by, for example, forming an anchoring portion h on a tip of the projection 25g.

It is to be understood that an intake joint structure for a turbocharger according to the invention is not limited to the above embodiments. For example, instead of the separate grommet made from soft material as the first soft layer, the first soft layer may be integrally molded on the outer periphery of the cylindrical portion of the backflow-preventive plate using the two-color molding.

REFERENCE SIGNS LIST 1 turbocharger
12 air inlet
18 lubricating oil
24 suction pipe
24a end
25 backflow-preventive plate
25a cylindrical portion
25b tapered portion
25c turnover portion
25d first annular groove
25e soft layer (second soft layer)
25f locking structure
25g projection
25h anchoring portion
26 grommet (first soft layer)
26a turnover portion
26b second annular groove
27 hose band

The invention claimed is:

1. An intake joint structure for a turbocharger capable of blocking backflow of lubricating oil at a connection position between an air inlet of the turbocharger and a suction pipe, comprising an integrally molded backflow-preventive plate having a cylindrical portion fitted over said air inlet and a tapered portion curved inward from an upstream end of said cylindrical portion and converged downstream to provide an open end, a downstream end of said suction pipe being integrally molded from soft material over a predetermined range using exchange blow molding, the cylindrical portion of said backflow-preventive plate being fitted over said air inlet via a first soft layer, the downstream end of said suction pipe being fitted over said cylindrical portion and being banded by a hose band.

2. The intake joint structure for the turbocharger as claimed in claim 1, wherein the cylindrical portion of the backflow-preventive plate has a downstream end turned over outward as turnover portion to provide a first annular groove opened upstream on which the downstream end of the suction pipe may abut for positioning.

3. The intake joint structure for the turbocharger as claimed in claim 1, wherein a separate grommet made from soft material is interposed as first soft layer between the cylindrical portion of the backflow-preventive plate and the air inlet.

4. The intake joint structure for the turbocharger as claimed in claim 2, wherein a separate grommet made from soft material is interposed as first soft layer between the cylindrical portion of the backflow-preventive plate and the air inlet.

5. The intake joint structure for the turbocharger as claimed in claim 3, wherein the grommet has a downstream end turned over outside as a turnover portion to provide a second annular groove opened upstream on which the turnover portion of the backflow-preventive plate may abut for positioning.

6. The intake joint structure for the turbocharger as claimed in claim 4, wherein the grommet has a downstream end turned over outside as a turnover portion to provide a second annular groove opened upstream on which the turnover portion of the backflow-preventive plate may abut for positioning.

7. The intake joint structure for the turbocharger as claimed in claim 1, wherein the cylindrical portion of the backflow-preventive plate has an outer periphery integrally molded with a second soft layer using two-color molding.

8. The intake joint structure for the turbocharger as claimed in claim 2, wherein the cylindrical portion of the backflow-preventive plate has an outer periphery integrally molded with a second soft layer using two-color molding.

9. The intake joint structure for the turbocharger as claimed in claim 3, wherein the cylindrical portion of the backflow-preventive plate has an outer periphery integrally molded with a second soft layer using two-color molding.

10. The intake joint structure for the turbocharger as claimed in claim 4, wherein the cylindrical portion of the backflow-preventive plate has an outer periphery integrally molded with a second soft layer using two-color molding.

11. The intake joint structure for the turbocharger as claimed in claim 5, wherein the cylindrical portion of the backflow-preventive plate has an outer periphery integrally molded with a second soft layer using two-color molding.

12. The intake joint structure for the turbocharger as claimed in claim 6, wherein the cylindrical portion of the backflow-preventive plate has an outer periphery integrally molded with a second soft layer using two-color molding.

13. The intake joint structure for the turbocharger as claimed in claim 1, wherein the cylindrical portion of the backflow-preventive plate is integrally molded as second soft layer using two-color molding and an interlocking structure is provided between an upstream end of the cylindrical portion and an outer periphery of the tapered portion.

14. The intake joint structure for the turbocharger as claimed in claim 2, wherein the cylindrical portion of the backflow-preventive plate is integrally molded as second soft layer using two-color molding and an interlocking structure is provided between an upstream end of the cylindrical portion and an outer periphery of the tapered portion.

15. The intake joint structure for the turbocharger as claimed in claim 3, wherein the cylindrical portion of the backflow-preventive plate is integrally molded as second soft layer using two-color molding and an interlocking structure is provided between an upstream end of the cylindrical portion and an outer periphery of the tapered portion.

16. The intake joint structure for the turbocharger as claimed in claim 4, wherein the cylindrical portion of the backflow-preventive plate is integrally molded as second soft layer using two-color molding and an interlocking structure is provided between an upstream end of the cylindrical portion and an outer periphery of the tapered portion.

17. The intake joint structure for the turbocharger as claimed in claim 5, wherein the cylindrical portion of the backflow-preventive plate is integrally molded as second soft layer using two-color molding and an interlocking structure is provided between an upstream end of the cylindrical portion and an outer periphery of the tapered portion.

18. The intake joint structure for the turbocharger as claimed in claim 6, wherein the cylindrical portion of the backflow-preventive plate is integrally molded as second soft layer using two-color molding and an interlocking structure is provided between an upstream end of the cylindrical portion and an outer periphery of the tapered portion.

* * * * *